Figure 1:
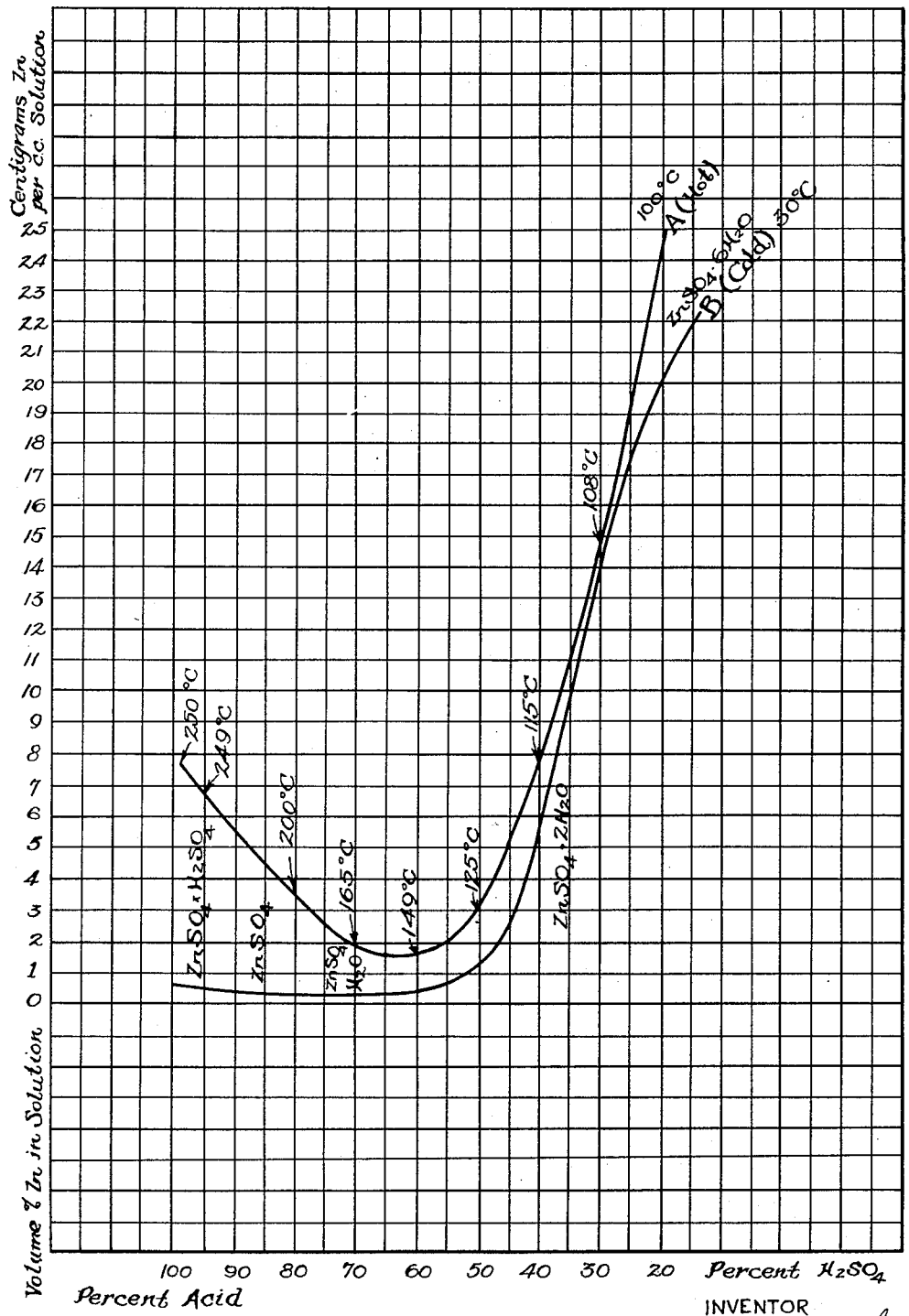
Figure 2:
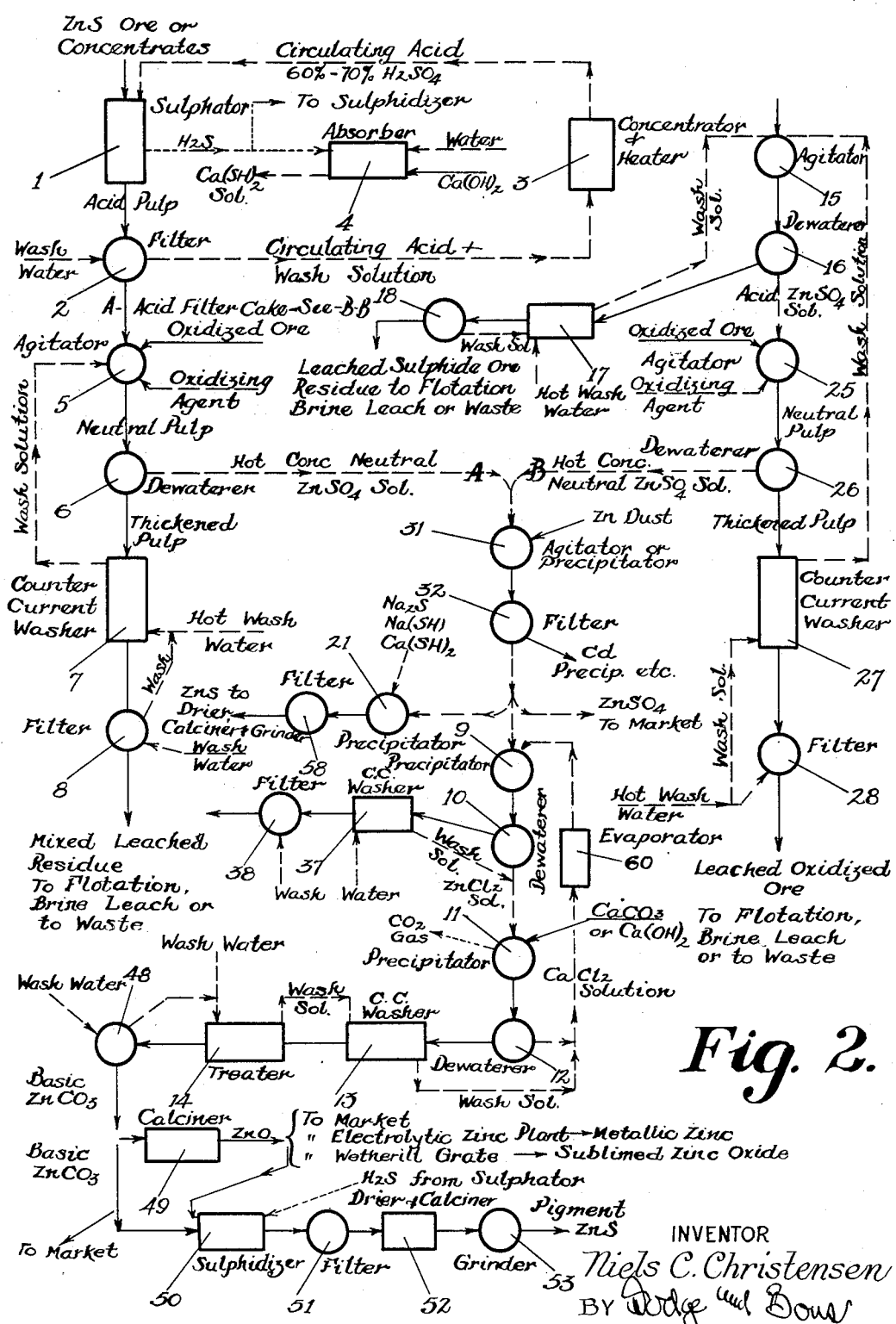

Dec. 5, 1933.   N. C. CHRISTENSEN   1,937,639
PROCESS OF MAKING ZINC SULPHIDE PIGMENT
Filed Sept. 23, 1931   2 Sheets-Sheet 2

INVENTOR
Niels C. Christensen
BY
ATTORNEYS

Patented Dec. 5, 1933

1,937,639

UNITED STATES PATENT OFFICE 1,937,639

PROCESS OF MAKING ZINC SULPHIDE PIGMENT

Niels C. Christensen, Salt Lake City, Utah

Application September 23, 1931
Serial No. 564,695

6 Claims. (Cl. 23—135)

This invention relates to the treatment of zinc ores. It relates primarily to the hydrometallurgical treatment of raw zinc sulphide ores so as to recover the zinc and sulphur therefrom without roasting. In the preferred form of the treatment of the sulphide ores, in my present process, a small proportion of oxidized ore is also treated for the recovery of zinc therefrom. The invention relates to the treatment of the sulphide ores with sulphuric acid by the methods similar to those described in my copending patent applications 523,575 and 523,576, both filed Nov. 18, 1931 and 564,697 filed September 23, 1931, which describe the applications of the process to the recovery of the zinc in metallic form by electrolysis. It is the object of this invention to recover the zinc as other products and by slightly different methods than those described in said applications.

As described in above mentioned pending patent applications, the first and essential step of the process consists in treating the ore with hot relatively concentrated sulphuric acid in such manner as to decompose the ZnS and form solid zinc sulphate and H$_2$S, which process is claimed in Ser. No. 565,153 filed September 25, 1931, and in 523,575. As noted in above said applications and as more fully described in my U. S. Patent 1,434,084, hot sulphuric acid of a concentration of approximately 60% or higher will attack ZnS forming ZnSO$_4$ and drive off the sulphur as H$_2$S. If sufficient H$_2$SO$_4$ is used the ZnSO$_4$ dissolves in the excess acid and a complete extraction of the zinc may be secured. However, as noted in above said patent and applications, a relatively very large volume of acid must be used to secure complete solution of the zinc by this method due to the limited solubility of ZnSO$_4$ in the acid. If a relatively small amount of acid is used, the reaction between the acid and the ZnS stops as the saturation point of the acid in the ZnSO$_4$ is approached, due to the formation of an insoluble superficial coating of ZnSO$_4$ upon the ZnS particles which protects the sulphide against further action by the acid. As noted in the copending patent applications mentioned above, I have found that this superficial coating may easily be removed by a gentle grinding or attrition, and thus allow the reaction between the hot acid and the ZnS particles to proceed until the ZnS is all converted into solid zinc sulphate. By thus grinding the zinc sulphide ore with the hot acid a complete conversion of the ZnS to solid ZnSO$_4$ occurs. This method makes it possible to sulphate all the zinc in the ore and drive off the sulphur as H$_2$S by the use of a relatively very small proportion of hot acid, as compared with that required in the process of Patent #1,434,084. The very large volume of acid required in the latter process is a serious handicap in commercial operation, whereas with the process of this present invention the volume of acid required is so small as to offer no difficulties in practical application.

Following the sulphating operation the excess of hot acid is separated from the ore residue and solid zinc sulphate by filtration. The filter cake containing the ore residue, zinc sulphate and some residual acid is then mixed with sufficient hot water to form a hot concentrated acid zinc sulphate solution. The acid in this solution is neutralized with oxidized zinc ore and any iron and manganese precipitated from solution during this treatment by addition of suitable oxidizing agent. This neutralizing and purifying step may be carried out either by separating the hot acid zinc sulphate solution from the insoluble ore residue by filtration and washing and thereafter treating the solution with the oxidized ore and oxidizing agent, or by mixing the oxidized ore and oxidizing agent with the mixture of ore residue and acid zinc sulphate solution. The second method saves one complete mixing, filtering and washing operation and is therefore preferred unless it is desired to keep the leached ore residues separate. The hot concentrated zinc sulphate solution thus formed is separated from the leached ore residue and treated with zinc dust to precipitate Cd, Cu, Ag, Pb from the solution. The pure hot concentrated zinc sulphate solution thus secured is utilized for making zinc sulphide, basic zinc carbonate, zinc oxide, or metallic zinc as briefly described in the following: For the direct manufacture of ZnS the zinc is precipitated from this solution as pure ZnS by treatment with Na$_2$S or NaSH (sodium monosulphide or sulphydrate) made from the H$_2$S generated in the sulphating treatment, or to make a calcium base lithopone (mixture of ZnS and CaSO$_4$) by precipitation with Ca(SH)$_2$ solution made from the H$_2$S generated in the sulphating treatment. The zinc sulphide product thus made is filtered, washed, dried, calcined at 500° C., quenched, and ground to form a white zinc sulphide pigment. To make the basic zinc carbonate, the hot concentrated zinc sulphate solution is mixed with CaCl$_2$ solution to form a zinc chloride solution and precipitate CaSO$_4$ as indicated in the following chemical equation:

$$ZnSO_4 + CaCl_2 = CaSO_4 + ZnCl_2$$

The hot zinc chloride solution thus formed is separated from the CaSO₄ precipitate by filtration and washing and the zinc is precipitated therefrom as a basic zinc carbonate by boiling the solution with finely divided CaCO₃ as indicated by the following chemical equation:

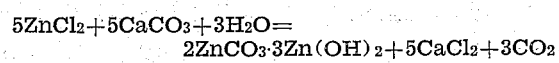

$$5ZnCl_2 + 5CaCO_3 + 3H_2O = 2ZnCO_3 \cdot 3Zn(OH)_2 + 5CaCl_2 + 3CO_2$$

This precipitate is ground and washed for the removal of Ca and Cl and may be dried and marketed as such or may be treated to make zinc sulphide or zinc oxide or for the recovery of metallic zinc. To make zinc sulphide this basic zinc carbonate is subject to sulphidizing operation preferably in suspension in water, the H₂S converting the zinc to the sulphide as indicated below:

$$2ZnCO_3 \cdot 3Zn(OH)_2 + 5H_2S = 5ZnS8H_2O + 2CO_2$$

This ZnS is filtered, washed, dried, calcined, and quenched and ground to make a white zinc sulphide pigment. The basic zinc carbonate may also be calcined to convert it to zinc oxide. The zinc oxide thus formed may be used as a pigment, or may be reduced with carbon or natural gas in a retort to secure metallic zinc, may be treated upon a Wetheril grate to make sublimed zinc oxide, or may be treated in suspension in water, with H₂S from the sulphating operation to make ZnS according to the following chemical equation:

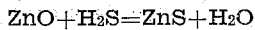

$$ZnO + H_2S = ZnS + H_2O$$

The ZnS thus formed being filtered, dried, calcined, quenched, and ground to form the white ZnS pigment. The zinc may also be recovered from the basic zinc carbonate or the zinc oxide by utilizing either of them to neutralize the acid formed in an electrolytic zinc circuit and thus recover the zinc therefrom by electrolysis.

The methods of carrying out the invention, as briefly outlined above, in its different applications, is illustrated in the accompanying flow sheets. The accompanying curves also illustrate the limiting conditions for efficient operation at important points in the process.

Figure I consists of two curves A and B showing the solubility of zinc sulphate respectively in hot and in cold acids of different concentrations.

Figure II shows a flow sheet of the process indicating the important steps and apparatus in the process.

As noted above, the essential and most important step in the process consists grinding the finely divided ore with an excess of hot sulphuric acid of a concentration preferably between 60% and 65% until the zinc is converted to ZnSO₄, the sulphur being driven off as H₂S. This operation is preferably carried out in an acid-proof silex or porcelain lined pebble mill, called sulphator (1), containing small flint pebbles or porcelain marbles as the grinding medium. The mill should preferably be jacketed and insulated to maintain the temperature and prevent loss of heat. Though there is some reaction between the acid and zinc sulphide at lower temperatures the reaction proceeds most rapidly at temperatures near the boiling point of the acid and it is preferable to keep the acid as near this temperature as possible during the grinding. From 10 to 30 minutes grinding is sufficient to sulphate substantially all the zinc in ores that are amenable to treatment by the process. In order to save the H₂S and keep it free from contamination with air, the ore and hot acid are fed into the mill at the feed end through a gas tight gland and the mixture of excess acid and sulphated ore and the H₂S gas are discharged through a gas tight gland into a discharge box at the discharge end, from which the sulphated pulp and excess acid flows, preferably through a shallow inverted siphon, to the filter (2) and from which the H₂S gas is discharged through pipes to the Ca(SH)₂ plant (4). The ratio of hot circulating acid (60% to 65% H₂SO₄) may vary from just enough acid to make a fluid pulp suitable for grinding to 2 or 3 parts (by weight) of acid to ore, or more if desired, though there is no advantage in using the larger volumes of acid. The amount of acid consumed in sulphating the zinc (and Pb, etc., if lead is present) is added with the ore preferably as hot 98% H₂SO₄. If the larger volumes of circulating acid are used this acid may be mixed with the incoming circulating acid, but if the smaller volume of circulating acid is used, the amount of 98% acid to be consumed in sulphating is preferably added progressively during the sulphating operation in order to avoid the use of acid of sufficient concentration to react with the H₂S and increasing the acid consumption. This feature is claimed in Ser. No. 565,153.

The consumed acid includes that used in sulphating the ZnS, etc., in the sulphide ore and also the acid neutralized by the oxidized ore (to be described below).

The mixture of sulphated ore and excess acid from the sulphator (1) passes to the filter (2) as much as possible of the acid is removed by filtration and if it is desired to cut down the amount of oxidized ore used in the process the filter cake is given a "flash" wash with water to remove as much of the acid as possible without dissolving any considerable amount of the ZnSO₄ in the cake. As will be noted by reference to the curves in Fig. I, a small wash which will only slightly dilute the acid in the cake will not remove much ZnSO₄ as the dilution of the acid from 65% to 50% does not greatly increase the solubility of the ZnSO₄. The excess circulating acid and washings from the acid-proof filter (2) are passed through the heater and concentrator (3) where the wash water is evaporated and the acid is heated for reuse and returned to the sulphator as shown. The H₂S goes to the absorber (4) where it is absorbed in a suspension of Ca(OH)₂ in water to form a Ca(SH)₂ solution or may go to an acid plant or sulphur recovery plant. The filter (2) must be acid proof and must be supplied with an acid proof filter medium such as filtros, alundum, or acid proof metal filter cloth. The sulphated pulp filters very readily and a rotating annular vacuum filter of the sand filter may be used for this purpose or a pressure filter such as the Burt may be used.

If the excess of acid used in the sulphating operation is kept as low as possible, it may not be necessary or possible to remove any excess of hot acid by filtration and this second step of the process may thus be avoided and the sulphated ore be sent directly to the washing or neutralizing operation, as described below. For practically complete recovery of the zinc, however, I have found that with most ores it is preferable or necessary to use such an excess of acid in the sulphating operation that the greater part of this excess must be separated from the ore before neutralizing in order to avoid the use of too large a proportion of oxidized ore.

The concentrator and heater (3) may be of any standard type of apparatus but the preferred type consists of a horizontal rotating cylinder (acid proof) enclosed with a suitable housing and slightly dipping into the acid which is thus thrown from the drum as a spray through which hot combustion gases are passed to evaporate the water and heat the acid. The H₂S absorber (4) consists preferably of a similar device, though any other suitable standard apparatus may be used.

The zinc sulphate in the filter-cake from the filter (2) may be recovered either of two ways as indicated respectively as A—A and B—B in the flow sheet. In the first method, A to A, the acid filter cake is mixed with sufficient hot water in the agitator (5) to dissolve the zinc sulphate and acid to form a hot acid concentrated zinc sulphate solution. To this mixture enough oxidized zinc ore (or oxidized zinc-lead ore) is added to neutralize the acid and dissolve the zinc out of the oxidized ore, and enough of an oxidizing agent such as lead peroxide, zinc peroxide, or chloride of lime or other suitable oxidizer to precipitate the iron and manganese out of the zinc solution. This neutralizing and purifying operation is carried out at a temperature between 60° and 80° C. (or higher) so as to secure a zinc sulphate solution of high concentration. The hot neutral zinc sulphate solution thus formed is washed out of the mixed leached residue of sulphide and oxidized ore by filteration and washing. This operation preferably carried out by means of a dewaterer or filter (6) followed by a washing operation in a counter-current washer (7) and final filter (8), as shown in the flow sheet, the wash solutions from the counter-current washer (7) and filter (8) being added to the agitator (5) to dissolve the zinc sulphate out of the sulphated ore from the sulphator (1).

In the second method, B to B, the acid filter cake from the filter (2) is mixed with sufficient hot water in the agitator (15) to dissolve the zinc sulphate and form a hot acid concentrated zinc sulphate solution. This acid solution is separated from the residue of leached lixiviated sulphide ore in the dewaterer (16) and the residual zinc sulphate solution is separated from the residue of ore in the counter-current washer (17) and filter (18), the wash solutions from (17) and (18) being added to the agitator (15) to dissolve the ZnSO₄ as shown in the flow sheet. The hot acid zinc sulphate solution is mixed with sufficient oxidized zinc (or zinc-lead) ore to neutralize the acid and dissolve the zinc in the oxidized ore, in the agitator (25) enough oxidizing agent being added near the end of this treatment to insure complete precipitation of any iron and manganese in the solution. The hot concentrated zinc sulphate solution thus formed is separated from the leached residue of oxidized ore in the dewaterer (26) and the residue of ore is separated from the residual solution in the counter-current washer (27) and filter (28), the wash solutions being returned to the agitator (15) for dissolving ZnSO₄ from the sulphated sulphide ore.

The mixed residue of sulphide and oxidized ore from A—A and the separate ore residues from B—B may be treated by the brine leaching process to recover any lead (or lead and silver) therein and the residue may be treated by flotation to recover the pyrite therefrom, or the residues may be discharged to waste if they contain no recoverable values. Any silver in solution may be precipitated from the ZnSO₄ solution by the addition of sufficient ZnCl₂ after neutralizing, or may be recovered from the ZnSO₄ solution by means of metallic zinc as mentioned below.

The hot concentrated neutral zinc sulphate solution obtain from A—A or B—B is treated with zinc dust in the agitator (31) to precipitate any Cu, Cd, Ag, or Pb, etc., in the solution and the precipitated metals and excess Zn dust are filtered out of the solution in the filter (32).

The pure hot concentrated zinc sulphate solution obtained by the foregoing processes may be treated in a variety of ways to prepare it for market or to make marketable zinc products therefrom as described in the following:

The solution may also be used to make lithopone by the standard methods. It may also be used to make pigment zinc sulphide or calcium base light-proof lithopone as described in the following: The Ca(SH)₂ made in the absorber (4) may be used to precipitate the ZnSO₄ solution and form a mixed precipitate of CaSO₄ and ZnS as indicated by the following chemical equation:

$$ZnSO_4 + Ca(SH)_2 = ZnS + CaSO_4 + H_2S$$

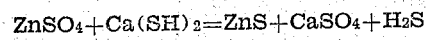

A small excess of Ca(SH)₂ is preferably used in this precipitation. The mixed precipitate preferably containing some excess Ca(SH)₂ is filtered out of the solution and dried, calcined, quenched and ground, washed and dried to make a calcium base lithopone consisting of anhydrous CaSO₄ and ZnS. The excess H₂S from the precipitation is returned to the absorber (4) to make more concentrated Ca(SH)₂ solution. The zinc may also be precipitated from the ZnSO₄ solution by means of NaSH made from the Ca(SH)₂ from the absorber (4) as indicated in the following chemical equation:

$$ZnSO_4 + 2Na(SH) = ZnS + H_2SNa_2SO_4$$

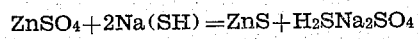

A small excess of NaSH or some Ca(SH)₂ should also preferably be present in solution at the end of this precipitation. The Na₂SO₄ is filtered out of the precipitate and is used to make the NaSH solution from the absorber (4) according to the following equation:

$$Ca(SH)_2 + Na_2SO_4 = CaSO_4 + 2NaSH$$

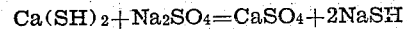

The excess H₂S from the ZnS precipitation is returned to the absorber (4) to make more Ca(SH)₂ solution. The ZnS precipitate containing a small amount of excess NaSH or a small amount of Ca(SH)₂ added at the end of the precipitation or during the filtering operation is dried, calcined, quenched, and ground, washed and dried to make a zinc sulphide pigment. The excess Ca(SH)₂ retained in the ZnS precipitate during the calcination improves the light-resisting qualities of the pigment.

The zinc sulphate may be treated with a CaCl₂ solution in the precipitator (9) to precipiate CaSO₄ and form a pure zinc chloride solution as indicated below:

$$ZnSO_4 + CaCl_2 = CaSO_4 + ZnCl_2$$

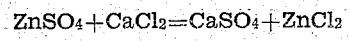

The CaSO₄ precipitate can be separated out of the ZnCl₂ solution in the dewaterer (10) and the residual ZnCl₂ can be removed by washing in the counter-current washer (37) and filter (38), the wash solution can be mixed with the ZnCl₂ solution from the dewaterer (10). If it is desired to market the ZnCl₂ solution as such, a relatively concentrated CaCl₂ solution is secured from an external source, but if the ZnCl₂ solution is to be used for preparation of other zinc products as shown on the flow sheet, the CaCl₂ solution is obtained described below. The hot dilute ZnCl₂ solution thus obtained is heated to boiling and a chemical equivalent of finely divided (ground or precipitated) CaCO₃ to ZnCl₂ in solution, is added and this mixture boiled until the zinc is substantially completely precipitated as a basic zinc carbonate. The precipitation requires from 30 minutes (or less) to an hour depending upon the fineness of the CaCO₃. To secure substantially complete precipitation, the solution should preferably not carry much above 2½% zinc, as the completeness of precipitation decreases with increase in concentration of the ZnCl₂ solution. The precipitated zinc product obtained as above described is not pure basic zinc carbonate but contains some unconsumed CaCO₃ and some Cl which may be removed as described below. The basic zinc carbonate precipitate is separated from the hot relatively dilute CaCl₂ solution in the dewaterer (12) and the CaCl₂ solution is sent to the CaSO₄ precipitator (9) as shown upon the flow sheet. The residual CaCl₂ is separated from the basic zinc carbonate precipitate in the counter-current washer (13) and the washed precipitate is ground with hot water in the treater (consisting of a pebble mill or other suitable grinder (14) to complete the reaction between the CaCO₃ and ZnCl₂ contained in the precipitate. The treated precipitate is then separated from the solution by filtration in the filter (48). The wash water from the filter (48) and the wash water used in the treater (14) are both used in the counter current washing operation and then mixed with the CaCl₂ solution and passed through the evaporator and heater (60) (preferably of the rotary cylinder spray type previously described) to evaporate the excess water before being returned to the precipitator (9).

The treatment of the basic zinc carbonate precipitate by grinding and washing with hot water may be repeated depending upon the degree of purity desired. If either the CaCO₃ or ZnCl₂ are in excess during this treatment sufficient CaCO₃ or ZnCl₂ may be added to bring them into equimolecular proportions.

The basic zinc carbonate secured as outlined above may be dried and marketed as such. It may also be used to neutralize the acid in a rapidly circulated electrolytic zinc circuit so as to maintain a highly concentrated and substantially neutral ZnSO₄ solution in the circuit and make electrolytic zinc therefrom with a considerable increase in economy over present electrolytic practice. It may also be calcined in the calciner (29) as indicated in the flow sheet to make zinc oxide. This product may be marketed as such as a zinc oxide pigment or may be used in an electrolytic zinc circuit for the recovery of the zinc in metallic form as described above for the basic zinc carbonate. If the ZnO is marketed as a pigment it should preferably be calcined at a high temperature since this treatment gives a pigment of higher covering power than the oxide formed at lower temperatures, whereas if the oxide is to be dissolved it should preferably be calcined at a lower temperature (300°–400° C.) to secure a more readily soluble product.

The zinc oxide made by calcining the basic carbonate may also be treated upon a Wetheril grate to make sublimed zinc oxide or may be treated in a retort plant to recover the zinc in metallic form. The zinc made from this product by retorting is equal in purity to the best grades of electrolytic zinc.

The basic zinc carbonate and the zinc oxide may both be used to make a high grade pigment zinc sulphide by treating them in suspension in water with H₂S from the sulphator (1). This operation is preferably carried out by passing the H₂S from the sulphator (1) into a spray formed of the water suspension of the basic zinc carbonate or oxide in the sulphidizer (50) until the products are completely sulphidized, as indicated below:

$$2ZnCO_3 \cdot 3Zn(OH)_2 + 5H_2S = 5ZnS + 8H_2O + 2CO_2$$
$$ZnO + H_2S = ZnS + H_2O$$

The basic zinc carbonate and the zinc oxide are hereinafter included in the expression "solid water-insoluble basic zinc compound", for brevity. The sulphidizer is preferably of the rotating cylinder spray type, enclosed in a housing as previously described. The ZnS from the sulphidizer is filtered and washed (if necessary) upon the filter (51) and is then dried and calcined in the calciner (52) at a temperature above 500° C. (preferably between 625° and 675° C.) and is then quenched and thereafter finely ground in the grinder 53 to make the finished zinc sulphide pigment. The product made in this way is a white pigment of high tinting strength and covering power and is very resistant to light.

From the foregoing brief description it will be apparent that the invention makes possible the treatment of raw zinc sulphide ores in such a way as to recover the zinc therefrom in a variety of diversified products of the highest purity by methods which are relatively cheap, and simple in operation.

Having described my process what I claim and desire to patent is:

1. The method of making pigment zinc sulphide which consists in treating finely divided solid zinc oxide with H₂S to convert the oxide into zinc sulphide and calcining, quenching and grinding said sulphide.

2. The method of making pigment zinc sulphide which consists in treating solid zinc oxide with H₂S in the presence of water to convert the oxide into zinc sulphide and calcining, quenching and grinding said sulphide.

3. The process of making a zinc sulphide pigment which consists in treating a finely divided solid zinc compound, selected from the herein described group consisting of zinc oxide and basic zinc carbonate, with H₂S to convert said compound into zinc sulphide and calcining and quenching and grinding said zinc sulphide.

4. The process of making a zinc sulphide pigment which consists in treating a finely divided solid zinc compound, selected from the group consisting of zinc oxide and basic zinc carbonate, with H₂S in the presence of water, to convert said zinc compound into zinc sulphide, and heating and quenching said zinc sulphide.

5. The process of making a zinc sulphide pigment which consists in treating finely divided solid basic zinc compound with H₂S to form zinc sulphide and heating the zinc sulphide to at least 500° C., quenching the same, and grinding same to a fine state.

6. The process of making a zinc sulphide pigment which consists in treating finely divided solid basic zinc carbonate with H₂S to convert said basic carbonate to zinc sulphide and heating said zinc sulphide to at least about 500° C., and quenching the same.

NIELS C. CHRISTENSEN.